Figure 1:
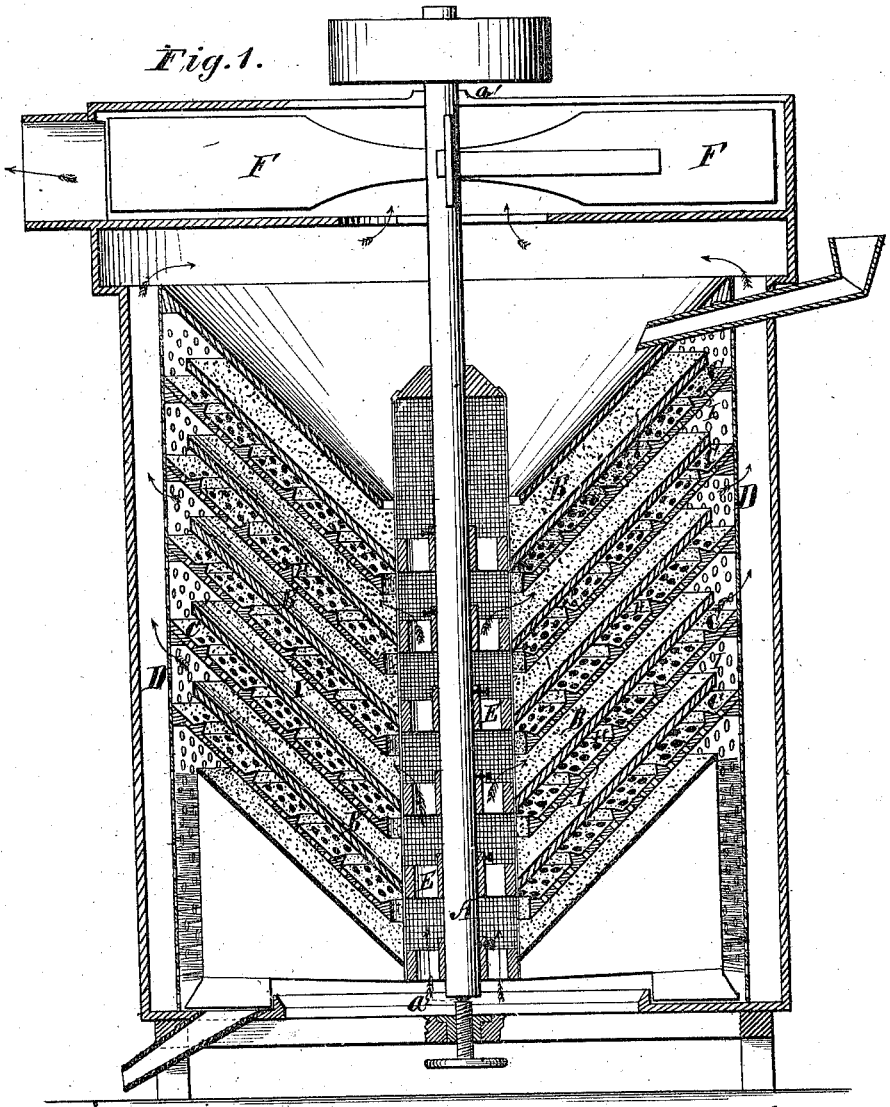

W. P. ROBINSON.
Improvement in Grain-Decorticating Machines.
No. 128,912. Patented July 9, 1872.

Witnesses.
Inventor:

128,912

UNITED STATES PATENT OFFICE.

WILLIAM PITT ROBINSON, OF BUFFALO, NEW YORK.

IMPROVEMENT IN GRAIN-DECORTICATING MACHINES.

Specification forming part of Letters Patent No. 128,912, dated July 9, 1872.

Specification describing certain Improvements in Machines for Scouring and Decorticating Grain and other Seeds, invented by W. PITT ROBINSON, of the city of Buffalo, in the county of Erie and State of New York.

I will here premise generally the nature and object of one of such machines as I have made my improvements upon. For instance, in my Letters Patent for improvement in grain-scouring machines dated January 16, 1872, I have shown and described a machine composed of a suitable frame containing the operative parts, and inside of that is attached a vertical case or shell whose walls are thoroughly perforated with holes; and in the center of this case is a vertical shaft, which is to revolve upon a suitable adjustable bearing upon its lower end, and around this shaft is fixed a hollow cylinder, made of sheet metal and thoroughly perforated with holes, or of strong wire-cloth, which revolves with the shaft; and to the outside of this hollow cylinder, and at regular intervals, are fastened a series of scouring or abrading wheels having the general form of the body of a funnel or of an inverted truncated cone. These wheels are a little less in diameter than the interior of the perforated shell, so that the seeds and grain thrown beyond their peripheries will have room to fall down between them and the shell. These wheels may be made of rough metal or other hard material for rubbing and abrading the cuticle or hulls of such grains or seeds, or they may be made of any suitable material, so far as their bodies are concerned, and then coated on one or both sides with emery, sand, or other like gritty substance or composition. Other plates or hoppers of some similar general form, and likewise roughened on one or both sides, are fastened to the inner surface of the shell before mentioned, with the same inclination, so as to be parallel to the revolving wheels, but they do not extend so low as to touch the said hollow cylinder, so that an annular space is left between the cylinder and hopper for the grain or seed to pass down through. Now, these stationary hoppers and revolving wheels are so arranged that every revolving wheel has one stationary hopper just above and another just below it, and every stationary hopper has one revolving wheel just above and just below it, except at the bottom and top of the series. Any fan or blowing apparatus is used to make a current of air through the hollow cylinder and out through its perforations, so as to drive out through the perforations in the shell all the dust and bits of hull, husk, bark, or bran, as they shall be disengaged from the seeds or grain. The grains or seeds to be scoured are fed upon the first hopper and flow of their own weight down in the direction of the hollow cylinder, and pass through the annular opening before mentioned down upon a revolving wheel, which in revolving rapidly carries it around until, by centrifugal force, it is thrown beyond and over its outer periphery, and then falls upon the next hopper below, and so on to the bottom of the series. Now, the defects of this construction I have found to be, first, that the seed or grain may flow down over the stationary hopper too fast and in currents, and reach the annular opening too soon, and before they have undergone sufficient mechanical action between and upon the stationary hoppers and revolving wheels; second, the surface of the stationary hoppers are likely to become incrusted with dust and trash, so as to hinder the perfect abrading action of the wheels and hoppers.

These defects I propose to remedy, as well as improve otherwise such machines, by my present invention; the first part of which relates to the construction of the stationary hoppers without any coating on either the upper or lower surface, and in combination with the upper surface of concentric circular ridges or elevations in the form of trihedral prisms upon the upper surface of the same, one or more in number upon each, to control and regulate the inward flow of the grain or seed and promote the equable spreading of the same over the surface. The second part of my invention relates to thoroughly perforating the entire body of such hoppers with holes as large as they may be without being large enough for such seed and grain to pass through them. The use of these holes is to prevent such incrustation as before mentioned, and to allow the smut, dust, dirt, trash, or decorticated matter to pass through and away from the grain just as fast as it shall become disengaged therefrom. They will also permit vertical jets and currents of air to pass through the hoppers and throw such dirt, dust, and trash out from among the grain, so that the outflowing currents may seize it and carry it out through the perforated shell. But for these two improvements some of the dirt and trash might escape, with the grain, through the machine; and, moreover, they greatly conduce to the thorough rolling and turning over of each individual grain, so that it may be acted upon by the abrading and scouring surfaces. The third part of my invention relates to the construction of the revolving scouring-wheels before mentioned in the same form shown in my said patent, and coating the under side of the same with emery, sand, spar, or other gritty substance, in combination with the stationary hopper before mentioned, so that such under surfaces, as the wheel revolves, shall roll, abrade, and scour the seeds or grain as they pass down over the surfaces of the stationary hoppers. The fourth part of my invention relates to the construction of such scouring-wheels with a like coating of the same material before mentioned upon their upper sides as well as upon the lower ones, in combination with the stationary hoppers described, to the end that while the grain and seeds are being winnowed, scattered, and thrown out beyond the peripheries of the wheels by their revolving motion they may also be scoured and decorticated by such upper surfaces.

My wheels or beaters have no teeth-rims, projections, or corrugations, but have plain though roughened surfaces, by reason of the described coatings merely.

Figure 2:
Figure 3:
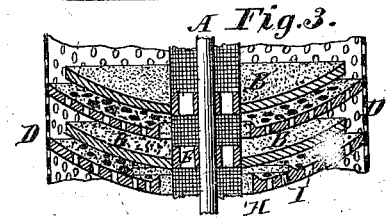

In the accompanying drawing, Figure 1 is a vertical central section of a machine containing my said improvements. Fig. 2 is a perspective view of one of the scouring-wheels, the hollow cylinder, and shaft. Fig. 3 is a vertical section, showing the stationary hoppers and revolving wheels in a little different form from the above described.

D indicates the perforated shell. B indicates the revolving wheels. C indicates the stationary hoppers, and H the concentric ridges, and I the perforations; E, the hollow cylinder; A, the shaft; $a^1$ $a^2$, the bearings for the shaft, and F the blower. The stationary hoppers C may be made of sheet metal and perforated, but I think strong wire-cloth will answer the purpose better; and the bodies of the revolving scouring-wheels B may be made of any suitable material, and both the wheels and hoppers, as well as the shaft A, hollow cylinder, and shell D, may have the forms shown.

Claims.

What I claim as my invention, and desire to secure by Letters Patent, is—

1. The concentric ridges H, in combination with the upper surface of the stationary hopper C, constructed substantially as and for the purpose set forth and described.

2. The combination of the stationary hoppers C, provided with the concentric ridges H, and perforations I, substantially as shown and described.

3. The combination of the scouring-wheels B, provided with a coating of emery, sand, spar, or other gritty substance upon the under side thereof, and the stationary hopper C, arranged substantially in the manner and for the purpose set forth.

4. The combination of the scouring-wheel B with a coating of emery, sand, spar, or other gritty substance on both the under and upper sides thereof, with the stationary hoppers C, arranged substantially in the manner and for the purpose set forth.

5. The combination of the stationary hopper C provided with concentric ridges H and perforations I with revolving scouring-wheels B provided with a coating of emery, sand, spar, or other gritty substance, and having the shaft A, hollow cylinder E, arranged substantially in the manner and for the purpose described.

W. PITT ROBINSON.

Witnesses:
H. R. SQUIER,
R. H. STEVENS.